US009847963B2

(12) United States Patent
Ishvarchandra

(10) Patent No.: US 9,847,963 B2
(45) Date of Patent: Dec. 19, 2017

(54) COMMUNICATING SERVICE DENIALS BACK TO CLIENT DURING MDNS SERVICE DISCOVERY

(71) Applicant: Cisco Technology, Inc., San Jose, CA (US)

(72) Inventor: Fajalia Bhavik Ishvarchandra, Bangalore (IN)

(73) Assignee: Cisco Technology, Inc., San Jose, CA (US)

( * ) Notice: Subject to any disclaimer, the term of this patent is extended or adjusted under 35 U.S.C. 154(b) by 98 days.

(21) Appl. No.: 14/049,485

(22) Filed: Oct. 9, 2013

(65) Prior Publication Data

US 2015/0100700 A1    Apr. 9, 2015

(51) Int. Cl.
*H04L 29/06* (2006.01)
*H04L 29/12* (2006.01)

(52) U.S. Cl.
CPC .......... *H04L 61/10* (2013.01); *H04L 61/1511* (2013.01); *H04L 61/2007* (2013.01); *H04L 61/2076* (2013.01)

(58) Field of Classification Search
CPC ...................................... H04L 29/06

USPC ......................................... 709/228
See application file for complete search history.

(56) References Cited

U.S. PATENT DOCUMENTS

| | | | | |
|---|---|---|---|---|
| 2006/0195565 A1* | 8/2006 | De-Poorter | ....... | H04L 29/12009 709/224 |
| 2011/0113045 A1* | 5/2011 | Bliem | .................... | G06Q 10/10 707/754 |
| 2012/0262754 A1* | 10/2012 | Hwang | ............. | H04N 1/00212 358/1.15 |
| 2014/0012967 A1* | 1/2014 | Agarwal | ............. | H04L 61/1511 709/223 |
| 2014/0086177 A1* | 3/2014 | Adjakple | ............. | H04W 12/08 370/329 |

* cited by examiner

*Primary Examiner* — Vivek Srivastava
*Assistant Examiner* — Sibte Bukhari
(74) *Attorney, Agent, or Firm* — Merchant & Gould P.C.

(57) ABSTRACT

Methods and systems may be provided to receive a first client request for a first service. A unicast mDNS query response may be provided to the first client, wherein the query response comprises information indicative of a denial of the first service and the query response is available for display to the first client.

20 Claims, 4 Drawing Sheets

COMMUNICATING SERVICE DENIALS BACK TO CLIENT DURING MDNS SERVICE DISCOVERY

TECHNICAL FIELD

The present disclosure relates generally to service denial messaging.

BACKGROUND

A wireless LAN controller may implement a mDNS gateway which may provide service discovery across one or more VLANs. The wireless LAN controller may also contain configurable policy information to control the access to service discovery based on a user's context. Prior systems were designed only to broadcast service information to the hosts connected to the mDNS gateway.

As such, prior systems are incapable of communicating service information to only a particular user. Particularly, there is no mechanism for informing the particular user about a denial of one of more desired services. This may be a problem in an enterprise environment where a large plurality of users may all be in communication with the mDNS gateway. Resultantly, a user in such an enterprise environment may not be able to receive individualized information pertaining to their perceived failed service discovery. Any information about service denial in prior art system has been available only to an administrator at the wireless LAN controller.

BRIEF DESCRIPTION OF THE FIGURES

The accompanying drawings, which are incorporated in and constitute a part of this disclosure, illustrate various embodiments of the present disclosure. In the drawings.

DETAILED DESCRIPTION OF EXAMPLE EMBODIMENTS

Overview

Figure 1:
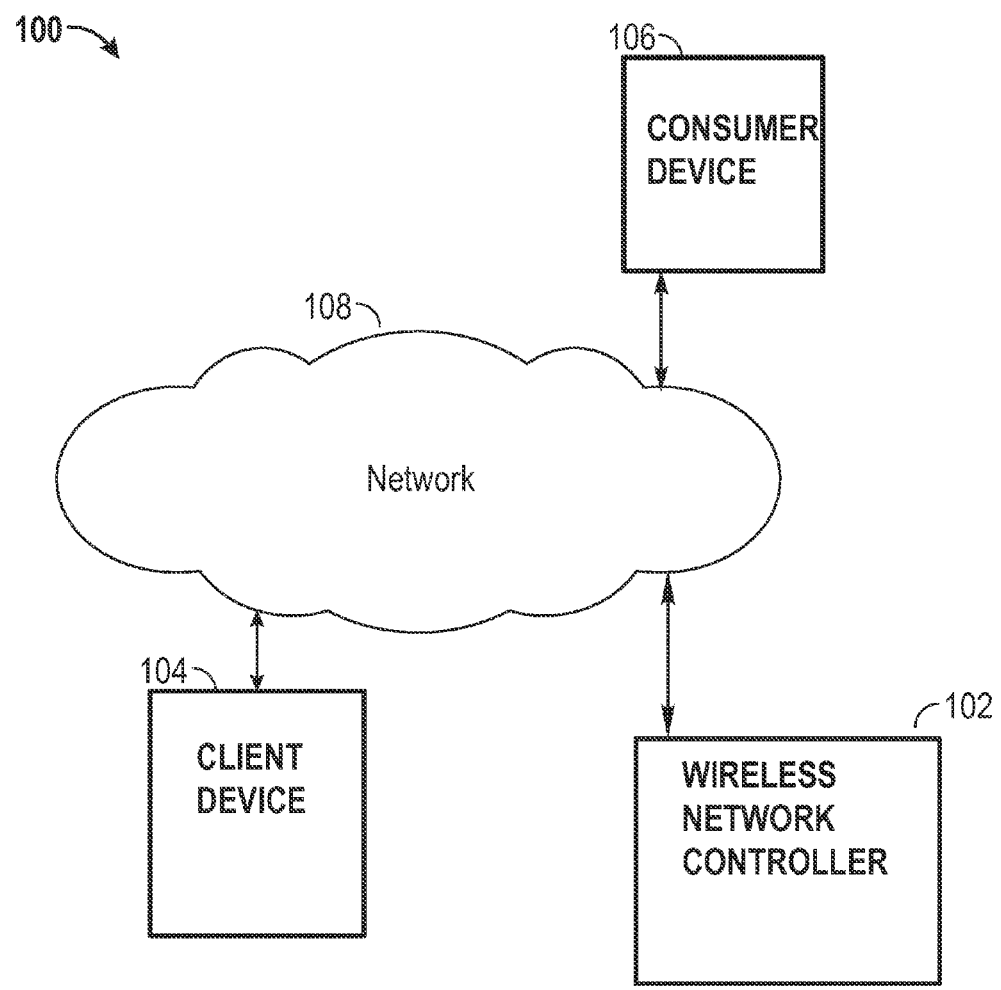
FIG. 1 shows a wireless networking environment according to embodiments of the present disclosure.

Methods and system may be provided to receive a first client request for a first service; send a unicast mDNS query response to the first client, wherein the query response comprises information indicative of a denial of the first service; and display the query response to the first client.

Both the foregoing overview and the following example embodiment are examples and explanatory only, and should not be considered to restrict the disclosure's scope, as described and claimed. Further, features and/or variations may be provided in addition to those set forth herein. For example, embodiments of the disclosure may be directed to various feature combinations and sub-combinations described in the example embodiment.

Example Embodiments

The following detailed description refers to the accompanying drawings. Wherever possible, the same reference numbers are used in the drawings and the following description to refer to the same or similar elements. While embodiments of the disclosure may be described, modifications, adaptations, and other implementations are possible. For example, substitutions, additions, or modifications may be made to the elements illustrated in the drawings, and the methods described herein may be modified by substituting, reordering, or adding stages to the disclosed methods. Accordingly, the following detailed description does not limit the disclosure. Instead, the proper scope of the disclosure is defined by the appended claims.

Bring Your Own Device (BYOD) is a phrase generally used to refer to the trend of employees using their personal communication devices in their workplaces. This trend is changing the enterprise network architecture across industry verticals. In order to provide robust functionality over a number of diverse devices, additional network intelligence may be required in order to provide service to corporate and personal devices in a simplistic manner without compromising security.

To fully realize this concept, network infrastructure may become "service-aware" and provide service availability seamlessly across the network. Access to those services may be controlled based on a user's context, e.g., identity, location, application and device in use. In a service-aware network, an authorized user may instantly see services available to them such as printers, projectors, and collaboration applications, without configuring their smart mobile device. However an un-authorized user should not be offered those services.

One such service-aware network is Bonjour from Apple. Bonjour is an implementation of a suite of zero-configuration networking protocols. Bonjour is designed to make network configuration easier for users in a home environment. For example, Bonjour lets you connect a printer to your network without the need to assign it a specific IP address or manually enter that address into each computer. With zero-configuration networking, nearby computers can discover its existence and automatically determine the printer's IP address. And if that address is a dynamically assigned address that changes, they can automatically discover the new address in the future.

Applications may also leverage Bonjour to automatically detect other instances of the application (or other services) on the network. For example, two users running an photo sharing app could share photos over a Bluetooth personal area network without the need to manually configure IP addresses on either device.

Bonjour supports advertising and discovering services in a manner that is efficient and robust using multicast DNS (mDNS) and, when needed, link-local addressing. mDNS based service discovery has introduced a way to advertise IP address, port numbers, domain name and the services using the mDNS protocol. However, in Bonjour, when a client service discovery is denied there is no mechanism to communicate to the users that their service request/discovery had been denied. Bonjour is designed to only broadcast service information to hosts in the network. There is no mechanism provided to provide a unicast message to a single subscriber containing individualized service request information. As such, users in enterprise environments were kept in dark without being informed as to why they were not able to discover the services.

Computers have gradually transitioned away from platform-specific protocols such as AppleTalk, IPX, and NetBIOS towards the Internet Protocol (IP). The ability to add devices to a local network and then connect to those devices from computers and other devices on the network all with little or no configuration has become a desirable feature.

For IP to work, each device needs a unique address, whether statically assigned or dynamically assigned by a DHCP server. A dynamically assigned address can change, so without mDNS based service discovery, for example, printers and other devices may have to be manually configured with a static address so that computers on the network can reach them. A network administrator might also have to configure a DNS server so that users can reach a device, such as a printer, using a descriptive name rather than an IP address. Such a configuration may be undesirable for the average user. Users have begun to expect to be able to use a device and quickly look for content servers and other service providing devices without spending additional time configuring their devices.

To support more convenient connectivity, mDNS based service discovery provides a simple and reliable way to configure and browse for services over one or more IP networks. Available services may be discovered and chosen from a list, instead of having to know each service's name or IP address in advance.

Consider, for example, the everyday task of printing. Once a printer is configured on a computer or remote device, it's simply a matter of choosing an application's Print command. However, if a laptop is taken to a business or a neighbor's house, printing can be difficult without additional configuration. If, however, the target printer supports mDNS based service discovery, printing, from the user's perspective, is just as easy as it was on the laptop's local network.

To print, the laptop may be connected to a client's Wi-Fi access point. The laptop should then automatically discover any available printers. For example, a document may be opened on the laptop and selected for printing. Every available printer may then appear in dialog box. An available printer may then be selected for use by the laptop. Network users no longer have to assign IP addresses, assign host names, or even type in names to access services on the network. Users may simply ask to see what network services are available, and choose from the list.

In many ways, this kind of browsing is even more powerful for applications than for users. Applications can automatically detect services they need or detect other applications they can interact with, allowing automatic connection, communication, and data exchange, without requiring user intervention.

However, in some sessions, certain services may not be made available to certain users. Service availability to an individual user may be based on any number of factors including, but not limited to: a user's context—identity, location, application and device in use Going back to the printer example above, a user may wish to print the document from a laptop to a printer that they perceive to be on the network. However, the user may be identified as one that is not on a list of users allowed access to the printer.

In Bonjour, the user would not be allowed to connect to the printer based on the user access decision. However, Bonjour provides no way for the network to inform the user that the printer is not available to them. The user only can assume that printer access has been denied, but Bonjour has no way to send information directly to the user about why the user request was denied. Bonjour does not provide for a unicast mDNS message to be sent to the single requesting user whose request has been denied.

This deficiency of Bonjour may become especially problematic in an enterprise environment where a large number of users are trying to access a plurality of services which may be available. The lack of individual unicast messaging to these users makes it difficult for users to understand what services are and are not available. Furthermore, making such unicast messaging available can allow communication of additional information for users so that they may determine how to properly access desired services.

mDNS service discovery, as employed by Bonjour and embodiments of the present disclosure, allows applications to find all available instances of a particular type of service and to maintain a list of named services and port numbers. The application can then resolve the service hostname to a list of IPv4 and IPv6 addresses, based on any number of naming protocols.

The list of named services provides a layer of indirection between a service and its current DNS name and port number. Indirection may allow applications to keep a persistent list of available services and resolve an actual network address just prior to using a service. The list allows services to be relocated dynamically without generating a large amount of network traffic announcing the change.

mDNS service discovery may be accomplished by "browsing." An mDNS query may be sent out for a given service type and domain, and any matching services subsequently reply with their names. The result may be a list of available services to choose from.

Services may not be tied to specific IP addresses or even host names. For example, a website may be hosted by multiple servers with different addresses. Within an organization, network administrators may need to move a service from one server to another to help balance a load. If clients store the host name (as in most cases they now do), they will not be able to connect if the service moves to a different host.

Queries in mDNS may instead be made according to the type of service needed, not the hosts providing them. Applications store service instance names, not addresses, so if the IP address, port number, or even host name has changed, the application can still connect.

In mDNS service discovery, when a host device is browsing for services, it does not continually send queries to see if new services are available. Instead, the host issues an initial query and may send subsequent queries exponentially less often. Services running on an mDNS service discovery-enabled host are announced automatically when they register with an mDNSResponder daemon.

A gateway may control the access to services based on a user's context—identity, location, application and device in use. In home environments, such as Bonjour, there is no method to inform the client if a certain service advertisement is blocked to the client based on user policy/device policy. Embodiments of the present specification provide for the sending of a unicast mDNS query response for a blocked service to inform a client of a service denial message. The mDNS query response may be employed to convey the service denial instead of sending additional service advertisements. The use of a unicast mDNS query response allows for individualized information to be provided to a plurality of users in an enterprise environment.

In some embodiments of the present disclosure, when a client sends an mDNS query with the name of the service, a wireless LAN controller (which acts as an mDNS gateway) may subsequently send to only that client a Layer-2 unicasted mDNS query response with a service provider string that starts with textual notification language, such as "Service Denied". The service provider string may further contain the name of the service, for example: "Service Denied:AppleTv._airplay._tcp.local.". The client who sent the mDNS query would receive this message. mDNS software on the client's device may then notify the requesting application that the service has been denied.

A service provider string record may be used to send additional information about the denial via the unicast mDNS message. In some embodiments of the present disclosure, a service name, a reason code, and a text string can be printed to the client service-listing screen for the user to see. In addition, contact information via email messaging and provision of URLs pointing to certain web pages can be included in the service provider string record for the user to obtain addition information for the denial. The user may then be able to determine the reason his service request was denied and be provided with recommended actions. Information contained in the service denial message is not limited to the examples provided herein.

Consistent with embodiments of the disclosure, methods and systems described herein may provide for providing notification of a denial of a first service via a unicast mDNS message. A mDNS request for the first service may be received from a first user. An indication may subsequently be received that a service advertisement for the first service is blocked to the first user based on a policy decision. A notification may then be provided to the first user indicating that the request is denied.

FIG. 1 is a block diagram of a wireless networking environment 100 consistent with embodiments of the disclosure. Networking environment 100 may comprise a network device, such as a wireless network controller 102, a client device 104, a consumer device 106, and a network 108. Consumer device 106 may be described in examples herein as a presentation device or a printing device, and can also include other devices which may be capable of receiving content from client device 104. Similarly, client device 104 may be described herein as a wireless computing device or a wired computing device, and can include other devices capable of use to send and receive content for example, but not limited to computers, mobile devices, tablet devices, smart phones, and televisions.

Network 108 may comprise any type of network or networks capable of transmitting and receiving content. System 100 may further include a plurality of gateways, for example, but not limited to cable modems, routers, switches, set top boxes, and computers. The plurality of gateways may respectively correspond to a plurality of client devices, such as client device 104.

Networking environment 100 may be any type of system that transmits data packets over a network (e.g., network 108). As an example, system 100 may be a cable modem system, and enabled to provide voice communications, and video and data services. System 100 may be based on a bi-directional transfer of packet based service, such as Internet Protocol (IP) traffic, between client device 104 and the plurality of gateways.

The plurality of client devices may be, for example, hardware components including software applications that allow the plurality of client devices to communicate and receive packets corresponding to streaming media. The plurality of client devices may provide a display and one or more software applications, such as a media player, for displaying streaming media to a respective one of the plurality of user devices. Further, the plurality of client devices may be capable of requesting and receiving data packets, such as data packets of streaming media, from the Internet. For example, client device 104 may be configured to send service requests to wireless network controller 102 for a particular available service, such as a request to present content on consumer device 106. The plurality of client devices may be wired and/or wireless devices, such as cellular phones, personal digital assistants (PDAs), computer devices or systems such as laptops, personal computers, set-top terminals, televisions with communication capabilities, DVD/CD recorders, etc.). An example client device 104, including its components, is described in detail with respect to FIG. 3.

The plurality of gateways may be devices configured to convert formatted data provided in one type of network to a particular format required for another type of network. A gateway, for example, may be a cable modem device, a server, a router, a firewall server, a host, or a proxy server. The gateway may have an ability to transform signals received from client device 104 into a signal that network 108 can understand and vice versa. The gateway may be capable of processing audio and video transmissions alone or in any combination, and is capable of full duplex media translations.

Network 108 may include any combination of wide area networks (WANs), local area networks (LANs), or wireless networks suitable for packet-type communications, such as Internet communications. As an example, network 108 may be a packet switched network or a hybrid-coaxial (HFC) cable network.

Wireless network controller 102 may be configured to receive the service request from a plurality of client devices, including client device 104, process the service request accordingly, and return a response back to the requesting client devices. For example, wireless network controller 102 may be a web server, an enterprise server, or any other type of server. Wireless network controller 102 may be a computer or a computer program responsible for accepting service requests (e.g., through HTTP, RTSP, or other protocols that can initiate and process service requests) from the plurality of client devices and serving or denying the plurality of client devices with streaming media. Client device 104 is described in greater detail below with respect to FIG. 2.

Figure 2:
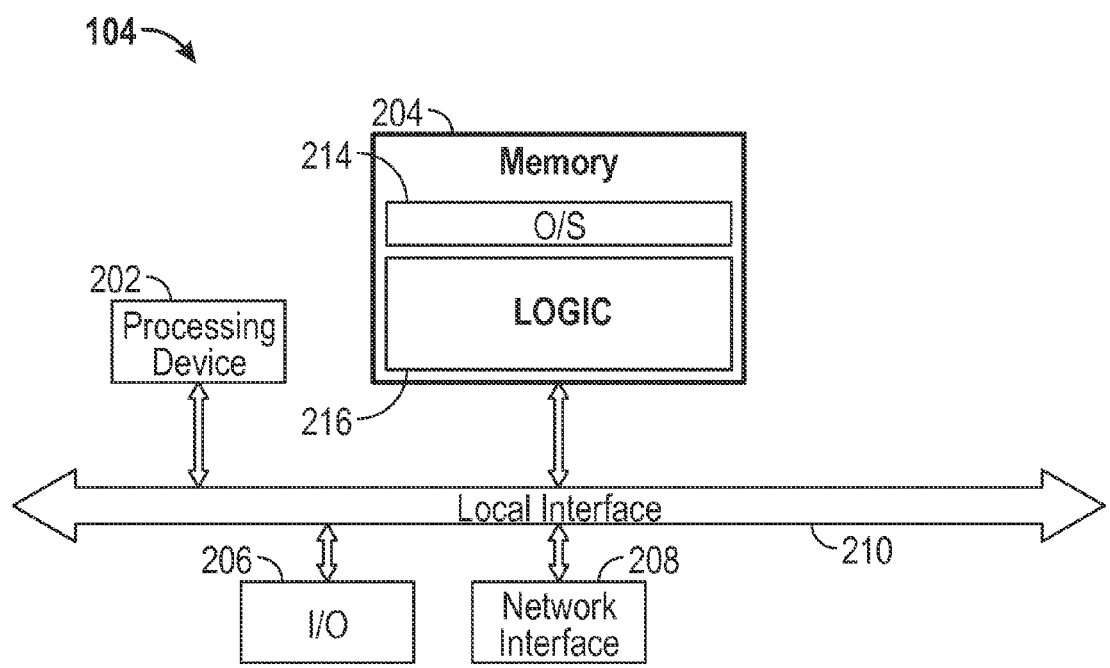
FIG. 2 shows a client device according to embodiments of the present disclosure.

FIG. 2 shows client device 104 in greater detail. As shown in FIG. 2, client device 104 may include a processing device 202, a memory 204, input/output (I/O) devices 206, and a network interface 208, each of which is communicatively coupled via a local interface 210. Processing device 202 may be a hardware device for executing software, particularly that which is stored in memory 204. Processing device 202 may be any custom made or commercially available processor, a central processing unit (CPU), an auxiliary processor among several processors associated with content server 102, a semiconductor-based microprocessor (in the form of a microchip or chip set), a microprocessor, or generally any device for executing software instructions.

Network interface 208 may include one or more devices that communicate both inputs and outputs, for instance but not limited to, a modulator/demodulator (modem for accessing another device, system, or network), a radio frequency (RF) transceiver or other type of transceiver, a telephonic interface, a bridge, a router, etc.

I/O devices 206 may include input devices, for example but not limited to, a keyboard, mouse, scanner, microphone, etc. Furthermore, the I/O devices 206 may also include output devices, for example but not limited to, a printer, display, etc.

Local interface 210 may be, for example but not limited to, one or more buses or other wired or wireless connections. Local interface 210 may have additional elements, which are omitted for simplicity, such as controllers, buffers (caches), drivers, repeaters, and receivers, to enable communications.

Further, local interface 210 may include address, control, and/or data connections to enable appropriate communications among the aforementioned components and provides the interface to communicate with wireless network controller 102.

In some embodiments, client device 104 may further be configured with an integrated storage device 212 coupled to local interface 210. Storage device 212 may be configured to store a plurality of content chunks. In some embodiments, storage device 212 may be externally coupled to content server 102.

Memory 204 may include a suitable operating system (O/S) 214. Operating system 214 essentially may control the execution of other computer programs, such as scheduling, input-output control, file and data management, memory management, and communication control and related services. Logic 216 may include executable code to send service requests to wireless network controller 102.

Memory 204 may include any one or combination of volatile memory elements (e.g., random access memory (RAM, such as DRAM, SRAM, SDRAM, etc.)) and non-volatile memory elements (e.g., ROM, hard drive, tape, CDROM, etc.). Moreover, the memory 204 may incorporate electronic, magnetic, optical, semi-conductive, and/or other types of storage media. Note that memory 204 may have a distributed architecture, where various components are situated remotely from one another, which can be accessed by the processing device 202.

The software in memory 204 may include one or more separate programs, each of which comprises an ordered listing of executable instructions for implementing logical functions. In the embodiment shown in FIG. 2, the software in memory 210 may include operating system 214 and logic 216, as explained above. Functionality of logic 216 may be implemented using a single module, or distributed among a plurality of modules.

When logic 216 is in operation, processing device 202 may be configured to execute logic 216 stored within memory 204, to communicate data to and from memory 204, and to generally control operations of logic 216. Logic 216 and O/S 214, in whole or in part, but typically the latter, are read by processing device 202, perhaps buffered within processing device 202, and then executed.

Wireless network controller 102 may include a communication interface suitable for enabling communication (e.g., TCP/IP) with other devices of environment 100, and for receiving and processing service requests to provide services at a consumer device 106. For instance, communication interface may be of a type suitable for communication over an IP network, a coaxial cable network, an HFC network, and/or wireless network, among others.

Consumer device 106 may further be configured with display and output logic, that may include graphics and video processing pipelines, among other circuitry to process the decoded pictures and associated audio and provide for presentation (e.g., display) on, or associated with, a display device or other media device. A communications port (or ports) may further be included in consumer device 106 for receiving information from and transmitting information to other devices. For instance, a communication port may feature USB (Universal Serial Bus), Ethernet, IEEE-1394, serial, and/or parallel ports, etc. In addition, a communications port may be configured for home networks (e.g., HPNA/MoCA, etc.). Consumer device 106 may also include an analog video input port for receiving analog video signals.

Figure 3:
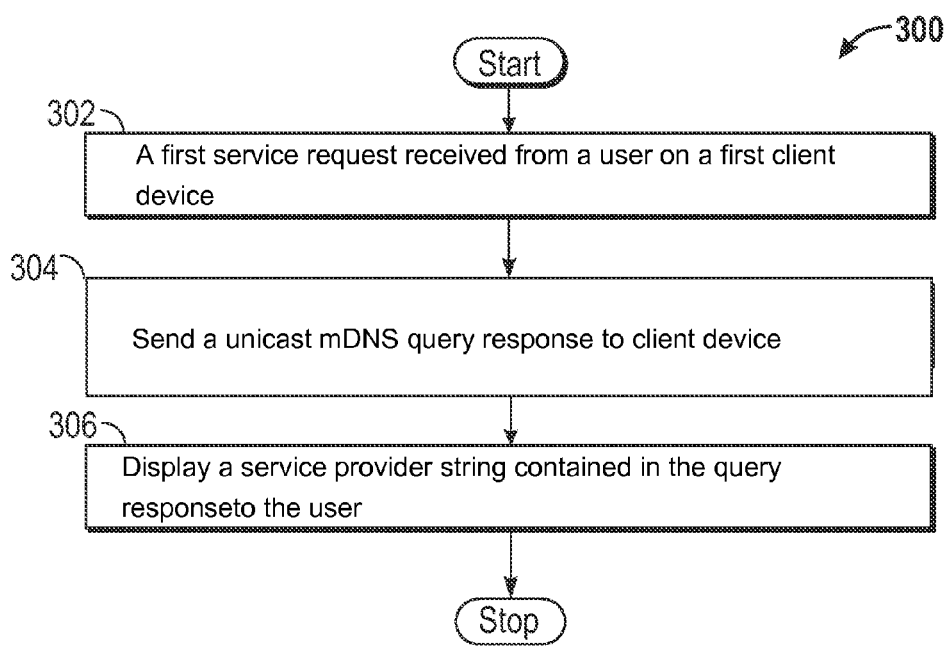
FIG. 3 is a flow chart illustrating embodiments of the present disclosure.

Having described various components of certain embodiments of system 100, a method 300 implemented by a processor associated with wireless network controller 102 will now be described with reference to FIG. 3. At block 302, a first service request may be received from a user on a first client device. As an example, client device 104 may send a service request to wireless network controller 102 where the service request is for presentation on consumer device 106 of content stored on client device 104. It should be understood that in embodiments of the present disclosure a service request should not be viewed as limited based on the type of service for which provision is requested.

At block 304, the processor associated with wireless network controller 102 may send a unicast mDNS query response to client device 104. The query response may comprise a service provider string. As discussed above, the service provider string may provide information indicative of a denial of the requested service.

At block 306, client device 104 may display the service provider string to the user. This allows the user to receive tangible feedback about why a service request has been denied. In some embodiments, the query response may also serve to notify a requesting client application of the service denial as well as the user. The service provider string may be obtained by wireless network controller 102 from a locally or remotely located database containing a plurality of service provider strings appropriate for different denial scenarios.

The service provider string may subsequently be stored in a memory associated with client device 104. The stored service provider strings may be parsed by client device 104 to obtain one or more pieces of information about the denial of service. In some embodiments of the present disclosure, such information may include one or more of the requested service name, denial reason codes, and a string descriptive of an indication that the service has been denied. Similarly, the query response may contain contact information for the user, if they wish to obtain additional denial information.

Figure 4:
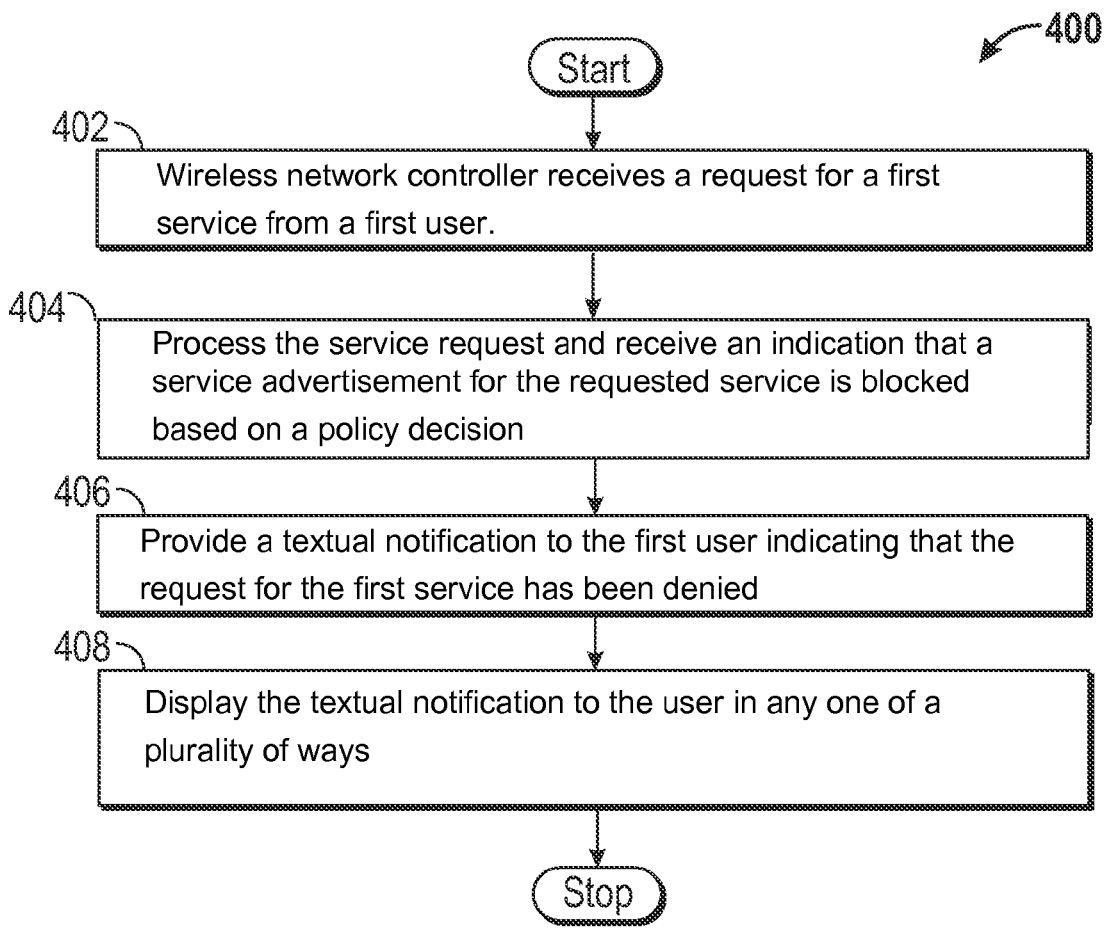
FIG. 4 is a flow chart illustrating embodiments of the present disclosure.

A method 400 implemented by a processor associated with wireless network controller 102 will now be described with reference to FIG. 4. At block 402, wireless network controller 102 may receive a request for a first service from a first user. For example, the request may come from a portable device being operating by the user in a networking environment controlled by wireless network controller 102.

At block 404, wireless network controller 102 may process the service request and receive an indication that a service advertisement for the requested service is blocked based on a policy decision. In some embodiments of the present disclosure, a policy controller, such as a Control And Provisioning of Wireless Access Points (CAPWAP) device, is responsible for making policy determinations as to whether or not a particular service will be advertised to a particular user. In some embodiments, wireless network controller 102 may be a CAPWAP device.

The determination may be made based on one or more user priorities. For example, a first user may be associated with one or more priority parameters. Policy parameters may relate to the amount of bandwidth provided to a user, the level of access to particular applications on an application by application basis, and any other number of appropriate parameters including parameters used for breaking ties in priority. In some embodiments of the present disclosure, priority decisions may be made to limit application access based on one or more of the following: location, owner, device, role, service, and VLAN.

At block 406, wireless network controller 102 may provide a textual notification to the first user indicating that the request for the first service has been denied. As discussed, the textual notification may contain multiple types of information. For example, in an enterprise networking environment (e.g., in a conference room or other mass client setting) a request may be made by a user to display data from the user's portable device to a projection device in the enterprise networking environment. One such projection device may be an IP communication capable television.

Finally, at block 408, the textual notification may be displayed to the user in any one of a plurality of ways. Some examples of display may include the use of one or more video effects, one or more audio tones, repetition of presentation for predetermined periods of time, presentation of the textual notification within a new window, overlaying the textual notification across a currently displayed video plane, and other similar presentation examples. The methods of display are not limited to the preceding list, rather are only constrained by the presentation capabilities of the device receiving the notice of service denial.

In another example, wireless network controller 102 may be connected to a plurality of gateways and routers. Wireless network controller 102 may communicate with the gateways and routers across a plurality of subnet boundaries. It should be understood that in some embodiments of the present disclosure, wireless network controller 102 may also be a wired network controller. In any case, wireless network controller 102 may be used to discover a plurality of available service across different networks.

Wireless network controller 102 may operate to snoop service discovery packets as they are sent across the network. Such requests may be learned and cached in memory by wireless network controller 102. Each request may be resolved based on policy decisions. The policy decisions may be based on one or both of user-based policies and device-based policies. The resolution of each request may result in either the granting of the requested service or the generation of a denial message. Wireless network controller 102 may then communicate the denial message (which may contain the reason for the denial) to the requesting user's device.

In some embodiments, a user may employ a browser similar to a Bonjour Service Browser. The browser may display a window containing an expandable listing of services that appear to be available on the network. For example a display device, such as an IPTV may be indicated as available along with a first printer and a second printer. It may be that access to the first printer has been denied to the requesting user. The requesting user may receive a unicast mDMS query response containing information regarding the denial.

The information contained in the unicast mDNS query response may then be displayed upon expanding the selection for the first printer in the browser window. The expanded entry may display information from the unicast mDNS query response. Such displayed information may include, but is not limited to identification of the requesting user and associated port, a denial reason (e.g., "Service is denied as per company policy"), and additional information about the denial (e.g., "Please go to X website for more information).

In some embodiments of the present disclosure, grouped services may be searched through a search "wizard". For example, a printer search wizard window may list service denial information as it searches through each of the available printers.

Embodiments of the disclosure, for example, may be implemented as a computer process (method), a computing system, or as an article of manufacture, such as a non-transitory computer program product or computer readable media. The computer program product may be a computer storage media readable by a computer system and encoding a computer program of instructions for executing a computer process. The computer program product may also be a propagated signal on a carrier readable by a computing system and encoding a computer program of instructions for executing a computer process. Accordingly, the present disclosure may be embodied in hardware and/or in software (including firmware, resident software, micro-code, etc.). In other words, embodiments of the present disclosure may take the form of a computer program product on a computer-usable or computer-readable storage medium having computer-usable or computer-readable program code embodied in the medium for use by or in connection with an instruction execution system. A computer-usable or computer-readable medium may be any medium that can contain, store, communicate, propagate, or transport the program for use by or in connection with the instruction execution system, apparatus, or device.

The computer-usable or computer-readable medium may be, for example but not limited to, an electronic, magnetic, optical, electromagnetic, infrared, or semiconductor system, apparatus, device, or propagation medium. More specific computer-readable medium examples (a non-exhaustive list), the computer-readable medium may include the following: an electrical connection having one or more wires, a portable computer diskette, a random access memory (RAM), a read-only memory (ROM), an erasable programmable read-only memory (EPROM or Flash memory), an optical fiber, and a portable compact disc read-only memory (CD-ROM). Note that the computer-usable or computer-readable medium could even be paper or another suitable medium upon which the program is printed, as the program can be electronically captured, via, for instance, optical scanning of the paper or other medium, then compiled, interpreted, or otherwise processed in a suitable manner, if necessary, and then stored in a computer memory.

Embodiments of the present disclosure, for example, are described above with reference to block diagrams and/or operational illustrations of methods, systems, and computer program products according to embodiments of the disclosure. The functions/acts noted in the blocks may occur out of the order as shown in any flowchart. For example, two blocks shown in succession may in fact be executed substantially concurrently or the blocks may sometimes be executed in the reverse order, depending upon the functionality/acts involved.

While certain embodiments of the disclosure have been described, other embodiments may exist. Furthermore, although embodiments of the present disclosure have been described as being associated with data stored in memory and other storage mediums, data can also be stored on or read from other types of computer-readable media, such as secondary storage devices, like hard disks, floppy disks, or a CD-ROM, a carrier wave from the Internet, or other forms of RAM or ROM. Further, the disclosed methods' stages may be modified in any manner, including by reordering stages and/or inserting or deleting stages, without departing from the disclosure.

While the specification includes examples, the disclosure's scope is indicated by the following claims. Furthermore, while the specification has been described in language specific to structural features and/or methodological acts, the claims are not limited to the features or acts described above. Rather, the specific features and acts described above are disclosed as example for embodiments of the disclosure.

What is claimed is:

1. A method comprising:
sending a first client request for a first service, the first client request comprising a multicast domain name system (mDNS) query;
receiving, in response to the mDNS query, a unicast individualized query response sent only to the first client, wherein the query response comprises a service provider string indicative of a denial of the first service to the first client, the service provider string comprising a textual notification indicative of the denial, a reason code, and a text string, wherein the text string is obtained from a database containing a plurality of text strings corresponding to different denial scenarios;
storing the reason code and the text string of the first service denial, wherein the text string comprises contact information for a source of additional denial information, the contact information comprising at least a website address corresponding to the location of the additional denial information; and
displaying the textual notification indicative of the denial to the first client, wherein displaying the textual notification further comprises displaying, upon selection of the textual notification, an expended entry comprising a denial reason and the website address corresponding to the location of the additional denial information.

2. The method of claim 1, further comprising parsing the query response to obtain one or more pieces of service denial information.

3. The method of claim 2, wherein the one or more pieces of service denial information comprise at least one of: a first service name, the denial reason code, and a text record describing the first service denial.

4. A method for providing notification of a denial of a first service comprising:
sending a multicast domain name system (mDNS) request for the first service from a first user;
receiving an unicast response to the mDNS request, the unicast response being individualized response sent only to the first user, the unicast response comprising a service provider string having a textual notification indicating denial of the first service, a reason code, and a text string, the text string comprising contact information for a source of additional denial information, the contact information comprising at least at least a website address corresponding to the location of the additional denial information, wherein the text string is obtained from a database containing a plurality of text strings corresponding to different denial scenarios;
providing, to an application on the first user that initiated the mDNS request, an indication that a service advertisement for the first service is blocked from the first user based on a policy decision, wherein the policy decision is made at least in part based on a location of the first user; and
displaying the textual notification to the first user indicating that the request is denied, wherein displaying the textual notification further comprises displaying, upon selection of the textual information, an expanded entry comprising the contact information comprising the at least a website address corresponding to the location of additional denial information.

5. The method of claim 4, wherein the policy decision is made by a remote device implementing mDNS gateway functionality.

6. The method of claim 5, wherein the one or more policies are further based on one or more of the following: an application owner, a device identification, a user role, a requested service, and a VLAN identification.

7. The method of claim 6, wherein the mDNS request is received from a portable device.

8. The method of claim 7, wherein the mDNS request is made in an enterprise conference room environment and the mDNS request comprises a request to display data from the portable device on a display device connected to the enterprise conference room environment.

9. The method of claim 7, wherein the mDNS request is made in an enterprise conference room environment and the mDNS request comprises a request to print data from the portable device on a printing device connected to the enterprise conference room environment.

10. An apparatus comprising:
a memory comprising logic; and
a processor configured by the logic to:
snoop a plurality of mDNS service discovery packets to learn the identification of the individual service requests;
cache the individual service requests in the memory;
receive a service request from an application on a first device;
resolve the received service request based on one or more policy decisions, wherein the one or more policy decisions are made at least in part based on a location of a requesting user;
send, in response to the resolving the received service request, a unicast individualized response only to the first device, the individualized response comprising a service provider string having a textual notification indicating denial of the first service, a reason code, and a text string, the text string comprising contact information for a source of additional denial information, the contact information comprising at least at least a website address corresponding to a location of the additional denial information, wherein the text string is obtained from a database containing a plurality of text strings corresponding to different denial scenarios; and
cause display of the textual notification indicating the denial of the first service at a first device, wherein the processor being configured to cause the display of the textual notification comprises the processor being configured to cause, upon selection of the textual notification, display of an expanded entry comprising the contact information comprising the at least a website address corresponding to the location of the additional denial information.

11. The apparatus of claim 10, wherein the processor is further configured with logic to provide the unicast denial message as an mDNS query response.

12. The apparatus of claim 10, wherein the apparatus is an mDNS gateway device.

13. The apparatus of claim 12, wherein one or more of the individual service requests are received from a device residing on a subnet different than a subnet associated with the apparatus.

14. The apparatus of claim 12, wherein the first service request is from a first client to display data from the first client to an IPTV connected wirelessly to the apparatus.

15. The apparatus of claim 10, wherein policy decisions are made based at least in part from information stored on a policy controller device remote from the apparatus.

16. The apparatus of claim 15, wherein the first client is a portable electronic device.

17. The method of claim 1, wherein sending the query response comprises sending a layer-2 (L-2) query response.

18. The method of claim 1, wherein displaying the query response to the first client further comprises displaying a textual notification indicating denial of the first service.

19. The method of claim 1, wherein displaying the query response to the first client further comprises displaying a reason for denial of the first service obtained from the reason code.

20. The method of claim 1, further comprising notifying, an application which initiated the mDNS query, the textual notification indicating the denial of service.

* * * * *